United States Patent
Yamamoto et al.

(10) Patent No.: US 11,942,768 B2
(45) Date of Patent: Mar. 26, 2024

(54) WIRE COVER AND WIRING MEMBER

(71) Applicant: Sumitomo Wiring Systems, Ltd., Yokkaichi (JP)

(72) Inventors: Hironobu Yamamoto, Yokkaichi (JP); Kyungwoo Kim, Yokkaichi (JP); Toshinari Kobayashi, Yokkaichi (JP); Moriyuki Shimizu, Yokkaichi (JP); Yukitoshi Terasaka, Yokkaichi (JP); Hiroyuki Koyano, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 17/813,071

(22) Filed: Jul. 18, 2022

(65) Prior Publication Data
US 2023/0019520 A1   Jan. 19, 2023

(30) Foreign Application Priority Data

Jul. 19, 2021 (JP) ................................ 2021-118928

(51) Int. Cl.
H02G 3/04 (2006.01)
(52) U.S. Cl.
CPC .......... *H02G 3/0437* (2013.01); *H02G 3/0418* (2013.01)
(58) Field of Classification Search
CPC ..................... H02G 3/0437; H02G 3/0418
See application file for complete search history.

(56) References Cited

U.S. PATENT DOCUMENTS

| | | | | |
|---|---|---|---|---|
| 5,315,062 A * | 5/1994 | Hoshino | ............ | H01R 13/506 439/658 |
| 5,643,693 A * | 7/1997 | Hill | .................. | H01M 50/296 429/123 |
| 5,897,392 A * | 4/1999 | Takahashi | ......... | H01R 13/5804 439/470 |
| 6,203,362 B1 * | 3/2001 | Tsuji | .................... | H01R 13/506 439/470 |
| 6,540,547 B2 * | 4/2003 | Zweigle | ............ | H01R 13/5804 439/468 |
| 7,038,133 B2 * | 5/2006 | Arai | .................... | H02G 3/0418 174/99 R |

(Continued)

FOREIGN PATENT DOCUMENTS

JP   2012-234659 A   11/2012

*Primary Examiner* — Krystal Robinson
(74) *Attorney, Agent, or Firm* — Honigman LLP

(57) ABSTRACT

A wire cover includes an inner cover member covering a bent section of an electric wire from an inner peripheral side and an outer cover member covering the bent section from an outer peripheral side. One end portion of the wire cover sandwiches the electric wire along a first direction. The other end portion of the wire cover sandwiches the electric wire along a second direction. The inner cover member and the outer cover member move relative to each other along the first direction. When observed from a third direction intersecting a plane that includes the first direction and the second direction, a first attachment portion and a second attachment portion are positioned outward of the surface of the inner cover body on the innermost side of the bent section or inward of the surface of the outer cover body on the outermost side of the bent section.

11 Claims, 13 Drawing Sheets

(56) References Cited

U.S. PATENT DOCUMENTS

| | | | |
|---|---|---|---|
| 8,523,602 B2* | 9/2013 | Figie | H01R 13/6581 |
| | | | 439/466 |
| 8,939,788 B2* | 1/2015 | Eminovic | H01R 43/26 |
| | | | 439/465 |
| 10,153,582 B2* | 12/2018 | Sato | H01R 13/502 |
| 10,913,407 B2* | 2/2021 | Baydoun | B60R 16/0222 |
| 2003/0159846 A1* | 8/2003 | Takahashi | H02G 3/0608 |
| | | | 174/68.3 |
| 2016/0207480 A1* | 7/2016 | Sekino | B60R 16/03 |
| 2017/0179697 A1* | 6/2017 | Terashima | H01R 13/562 |
| 2018/0312122 A1* | 11/2018 | Kakimi | B60R 16/0238 |
| 2021/0202133 A1* | 7/2021 | Kasugai | H01B 13/01209 |
| 2023/0104418 A1* | 4/2023 | Krah | H01R 13/639 |
| | | | 439/367 |

* cited by examiner

WIRE COVER AND WIRING MEMBER

CROSS-REFERENCE TO RELATED APPLICATIONS

This application claims priority of Japanese Patent Application No. JP 2021-118928 filed on Jul. 19, 2021, the contents of which are incorporated herein.

TECHNICAL FIELD

The present disclosure relates to a wire cover and a wiring member.

BACKGROUND

JP 2012-234659A discloses a connector cover that is coupled to a wire connection side of a side-outlet connector. A direction in which a body cover and a lid cover of the connector cover are engaged with each other is orthogonal to a bent surface of an electric wire. The body cover and the lid cover are locked using a locking portion of the body cover and a lock portion of the lid cover.

In the connector cover according to Patent Document 1, lock structures that each include a locking portion and a lock portion are respectively positioned outside the wall of the connector cover on the inner peripheral side of a bent section of an electric wire and outside the wall of the connector cover on the outer peripheral side of the bent section. A space is desirably secured at least on one of the inner side and the outer side of the bent section of the electric wire.

SUMMARY

In view of this, an object of the present disclosure is to provide a technique for enabling a space to be secured on at least one of the inner side and the outer side of a bent section of an electric wire, in a wire cover that holds the bent section.

A wire cover according to the present disclosure is a wire cover that holds a bent section of an electric wire, and includes an inner cover member that includes an inner cover body that covers the bent section from an inner peripheral side thereof, a first inner attachment portion provided at one end portion of the inner cover body, and a second inner attachment portion provided at the other end portion of the inner cover body, and an outer cover member that includes an outer cover body that covers the bent section from an outer peripheral side thereof, a first outer attachment portion provided at one end portion of the outer cover body, and a second outer attachment portion provided at the other end portion of the outer cover body, the inner cover member and the outer cover member are fixed through attachment of a first attachment portion that includes the first inner attachment portion and the first outer attachment portion and a second attachment portion that includes the second inner attachment portion and the second outer attachment portion, the one end portion of the inner cover body and the one end portion of the outer cover body sandwich the electric wire along a first direction, the other end portion of the inner cover body and the other end portion of the outer cover body sandwich the electric wire along a second direction that intersects the first direction, the first attachment portion and the second attachment portion are positioned outward of a surface of the inner cover body on the innermost side of the bent section or inward of a surface of the outer cover body on the outermost side of the bent section when observed from a third direction that intersects a plane that includes the first direction and the second direction, and the inner cover member and the outer cover member move relative to each other along the first direction such that the first attachment portion and the second attachment portion are attached to the inner cover member and the outer cover member.

According to the present disclosure, it is possible to secure a space at least on one of the inner side and the outer side of a bent section of an electric wire, in a wire cover that holds the bent section.

DETAILED DESCRIPTION OF PREFERRED EMBODIMENTS

Figure 1:
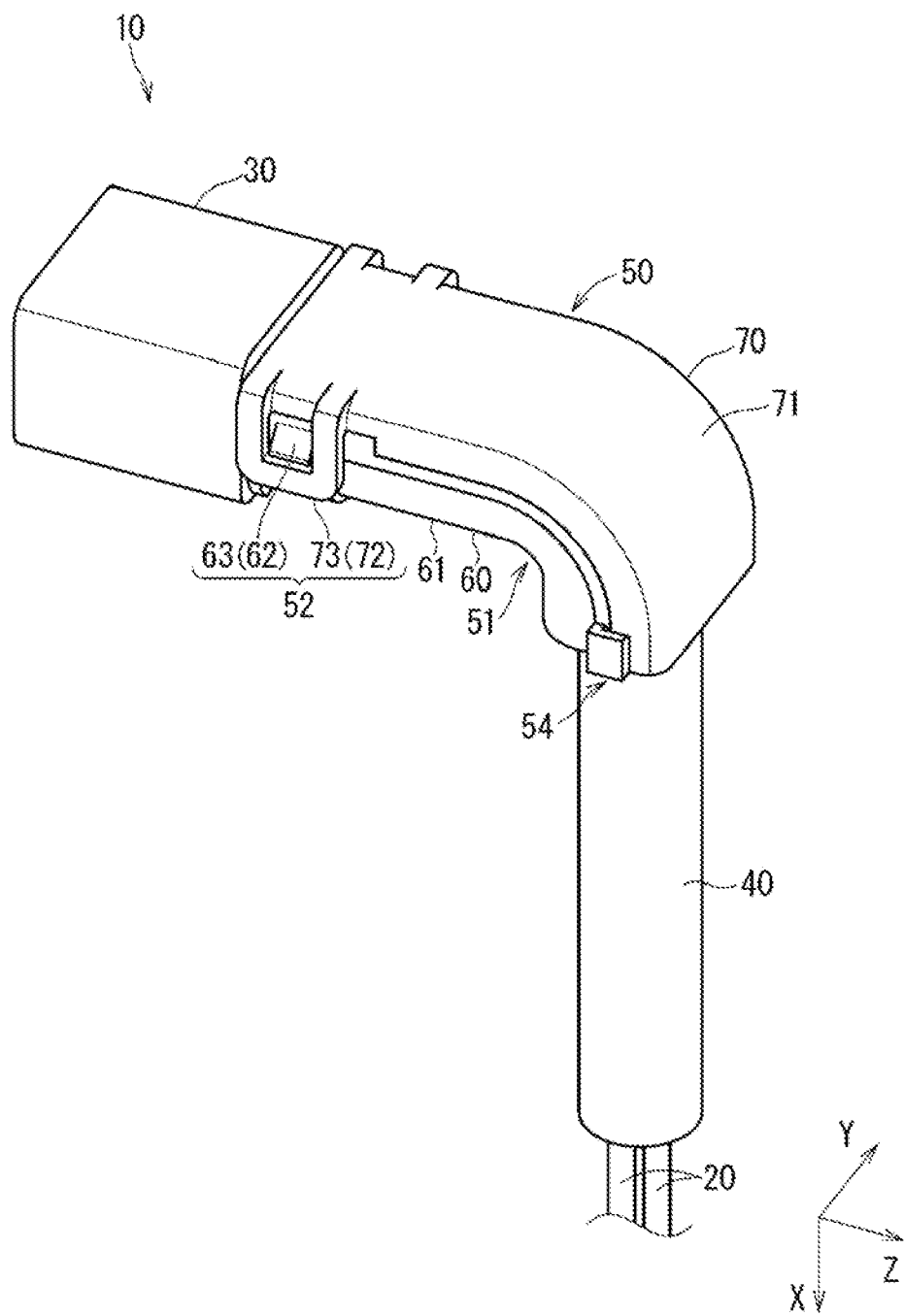
FIG. 1 is a perspective view showing a wire cover and a wiring member according to a first embodiment, the wiring member including the wire cover.

First, embodiments of the present disclosure will be listed and described.

A wire cover according to the present disclosure is as follows.

First Aspect

In a first aspect, a wire cover that holds a bent section of an electric wire, the wire cover including: an inner cover member that includes an inner cover body that covers the bent section from an inner peripheral side thereof, a first inner attachment portion provided at one end portion of the inner cover body, and a second inner attachment portion provided at the other end portion of the inner cover body, and an outer cover member that includes an outer cover body that covers the bent section from an outer peripheral side thereof, a first outer attachment portion provided at one end portion of the outer cover body, and a second outer attachment portion provided at the other end portion of the outer cover body, the inner cover member and the outer cover member are fixed through attachment of a first attachment portion that includes the first inner attachment portion and the first outer attachment portion and a second attachment portion that includes the second inner attachment portion and the second outer attachment portion, the one end portion of the inner cover body and the one end portion of the outer cover body sandwich the electric wire along a first direction, the other end portion of the inner cover body and the other end portion of the outer cover body sandwich the electric wire along a second direction that intersects the first direction, the first attachment portion and the second attachment portion are positioned outward of a surface of the inner cover body on the innermost side of the bent section or inward of a surface of the outer cover body on the outermost side of the bent section when observed from a third direction that intersects a plane that includes the first direction and the second direction, and the inner cover member and the outer cover member move relative to each other along the first direction such that the first attachment portion and the second attachment portion are attached to the inner cover member and the outer cover member. In the wire cover that holds the bent section of the electric wire, the first attachment portion and the second attachment portion are provided bypassing regions on the inner side and outer side of the bent section. For this reason, it is possible to secure a space on at least one of the inner side and the outer side of the bent section.

Second Aspect

In a second aspect, the wire cover according to the first aspect, at the one end portions that include the first attachment portion, the inner cover member and the outer cover member may engage with each other in all of the first direction, the second direction, and the third direction, and, at the other end portions that include the second attachment portion, the inner cover member and the outer cover member may overlap each other in the second direction and the third direction, and engage with each other in the second direction and the third direction of the first direction, the second direction, and the third direction. Accordingly, the inner cover member and the outer cover member can be easily fixed using the first attachment portion and the second attachment portion.

Third Aspect

In a third aspect, the wire cover according to the second aspect, at the other end portions that include the second attachment portion, the inner cover member and the outer cover member may overlap each other to form a three-or-more-layered structure along the second direction and the third direction. Accordingly, the second attachment portion is unlikely to open in the second direction and the third direction.

Fourth Aspect

In a fourth aspect, the wire cover according to the third aspect, at the other end portions that include the second attachment portion, the inner cover member and the outer cover member may overlap each other to form a four-or-more-layered structure along the second direction and the third direction. Accordingly, the second attachment portion is even less likely to open in the second direction and the third direction.

Fifth Aspect

In a fifth aspect, the wire cover according to any one of the first to the fourth aspects, a mount portion that is fitted into a rear end portion of a connector may be provided at one of the one end portion and the other end portion of the inner cover body and the outer cover body. Accordingly, the wire cover can be mounted to the connector, and hold the bent section of the electric wire extending from the connector.

Sixth Aspect

In a sixth aspect, the wire cover according to any one of the second to the fourth aspect, a mount portion that is fitted into a rear end portion of a connector may be provided at the one end portion of the inner cover body and the outer cover body, the mount portion may include an internal groove formed in an inner surface of the inner cover body and an external groove formed in an inner surface of the outer cover body, and a flange portion of the rear end portion of the connector may be fitted into the internal groove and the external groove. Accordingly, the flange portion of the rear end portion of the connector can be fitted into the internal groove and the external groove, and the mount portion can be provided at the one end portion that includes a locking portion, whereby the state in which the mount portion is mounted to the rear end portion of the connector is easily stabilized.

Seventh Aspect

In a seventh aspect, the wire cover according to any one of the first to the sixth aspects, a tubular member attaching portion that overlaps a tubular member may be provided at the other end portions of the inner cover body and the outer cover body. Accordingly, the tubular member such as a rubber hose can be attached to the wire cover.

Eighth Aspect

In an eighth aspect, the wire cover according to any one of the first to the seventh aspects, a water drainage hole may be formed in at least one of the inner cover body and the outer cover body. Accordingly, water in the wire cover can be escaped to the outside of the wire cover through the water drainage hole.

Ninth Aspect

In a ninth aspect, the wire cover according to any one of the first to the eighth aspect, the inner cover member and the outer cover member may be injection-molded articles obtained using metal molds, and may be formed into shapes that have no undercut so as to be removable upward and downward from the metal molds. Accordingly, the shapes of the metal molds are simplified and it is possible to suppress an increase in the cost.

Tenth Aspect

In a tenth aspect, the wire cover according to any one of the first to the ninth aspects, the first attachment portion and the second attachment portion may be positioned outward of the surface of the inner cover body on the innermost side of the bent section and inward of the surface of the outer cover body on the outermost side of the bent section when observed from the third direction. Accordingly, it is possible to secure a space on both the inner side and the outer side of the cover body.

Eleventh Aspect

In an eleventh aspect, a wiring member according to the present disclosure is a wiring member that includes an electric wire that includes a bent section that is disposed along a bent path, and the wire cover according to any one of the first to the tenth aspects attached to the bent section. Accordingly, it is possible to secure a space on at least one of the inner side and the outer side of the bent section while keeping the bent section of the electric wire held in the wire cover.

Specific examples of the wire cover according to the present disclosure will be described with reference to the attached drawings. It should be noted that the present disclosure is not limited to these examples, but is indicated by the claims, and all changes that come within the meaning and range of equivalency of the claims are intended to be embraced therein.

First Embodiment

Figure 2:
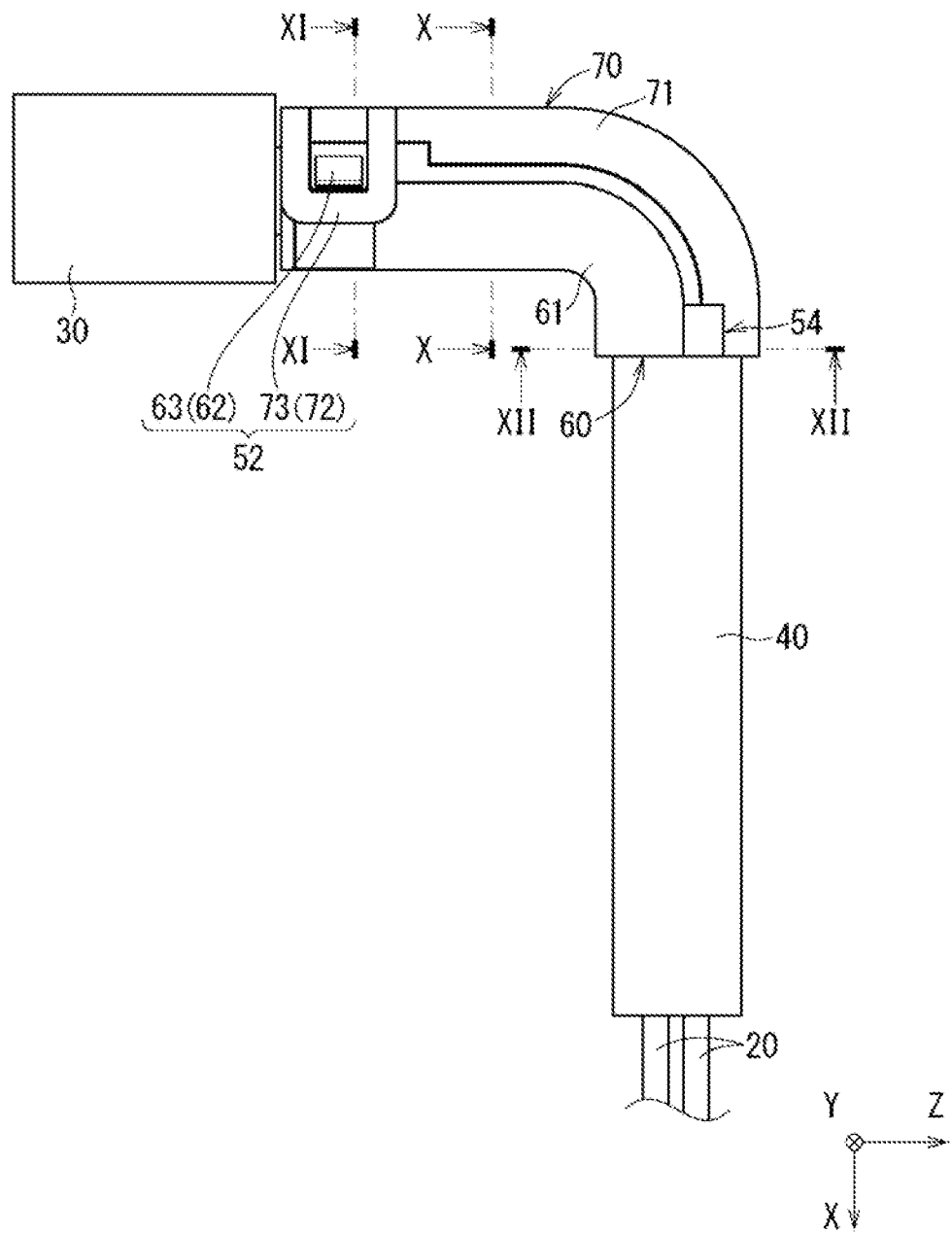
FIG. 2 is a side view showing the wiring member.
Figure 3:
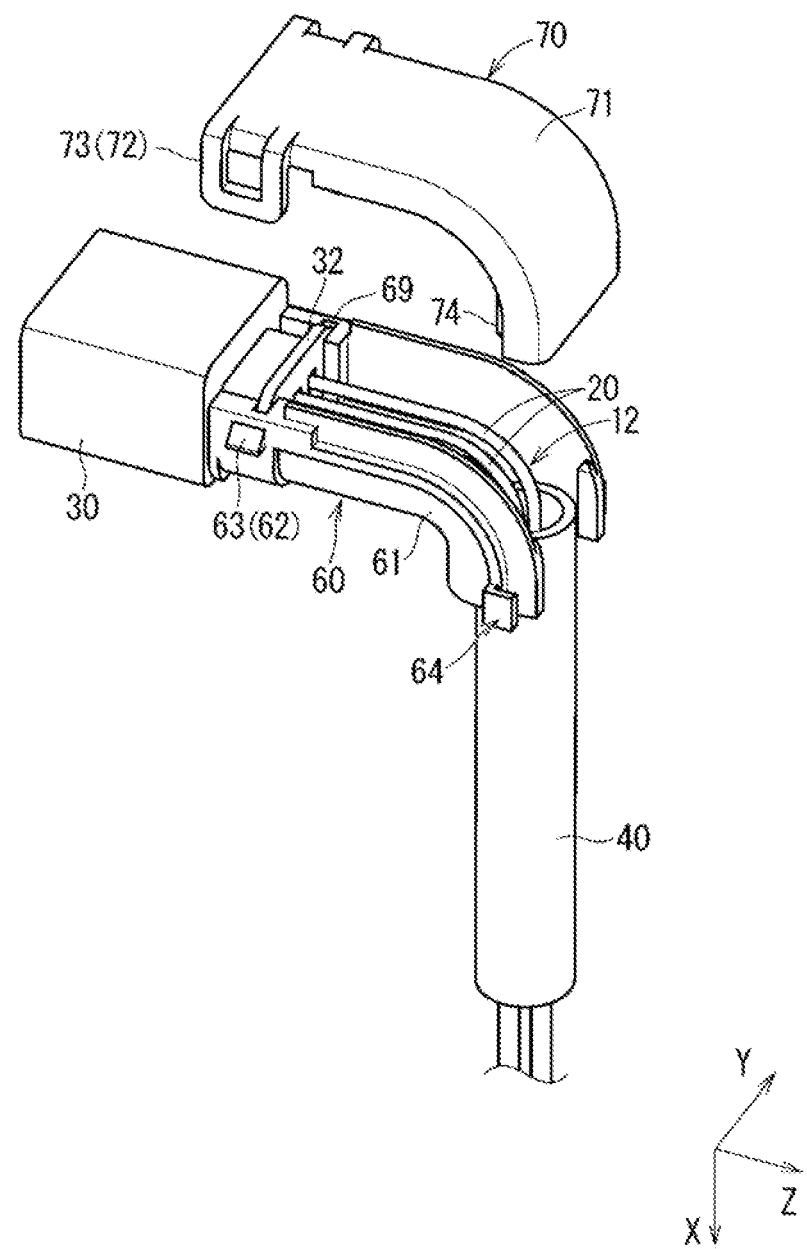
FIG. 3 is an exploded perspective view showing the wiring member.

A wire cover and a wiring member according to a first embodiment, the wiring member including the wire cover, will be described below. FIG. 1 is a perspective view showing a wire cover 50 and a wiring member 10 according to the first embodiment, the wiring member 10 including the wire cover 50. FIG. 2 is a side view showing the wiring member 10. FIG. 3 is an exploded perspective view showing the wiring member 10. FIG. 1 shows an X direction, a Y direction, and a Z direction as three directions orthogonal to each other. The X direction, the Y direction, and the Z direction in FIG. 2 and onward correspond to the X direction, the Y direction, and the Z direction in FIG. 1.

Wiring Member

The wiring member 10 includes an electric wire 20 and the wire cover 50. It is envisioned that the wiring member 10 is disposed along a bent path in a vehicle or the like. For this reason, the electric wire 20 includes a bent section 12 disposed along the bent path. The wire cover 50 is attached to the bent section 12. The bent section 12 is held in a bent state by the wire cover 50. The shape into which the wiring member 10 is bent is determined in accordance with the positional relation of a portion to which an end portion of the wiring member 10 is attached, the layout of interfering members in a portion where the wiring member 10 is to be disposed, and the like.

At least one electric wire 20 is provided. The electric wire 20 is a coated electric wire that includes a core wire and a coating layer, for example. The core wire is a stranded wire obtained by twisting a plurality of strands, for example. The strands may be made of a metal such as copper or aluminum. The coating layer is formed by performing extrusion coating using a resin around the core wire, for example. The resin may be polyethylene, polyvinyl chloride, or the like. The electric wire 20 may be a cable in which a plurality of wires are covered by a sheath.

The wiring member 10 may be disposed at any position in the vehicle. One end portion of the wiring member 10 may be connected to a device that is disposed at an underbody position of the vehicle, for example. The electric wire 20 may be used as a power supply line or a signal line. The electric wire 20 may be a power supply line for supplying power to an EPB (Electric Parking Brake) or an EMB (Electro-Mechanical Brake), for example. In addition, for example, the electric wire 20 may also be a signal line for transmitting a signal from a sensor for detecting wheel speed, or the like, in an ABS (Anti-Lock Brake System).

A connector 30 is provided at an end portion of the electric wire 20. The connector 30 is connected to a partner connector provided in a device or the like. The connector 30 includes a connector housing and a connector terminal. The core wire of the electric wire 20 is connected to the connector terminal. The electric wire 20 and a device are connected via the connector 30. In this example, a description will be given assuming that the bent section 12 is provided in a portion of the electric wire 20 extending from the connector 30. In this example, a flange portion 32 is provided in a rear end portion of the connector 30. The flange portion 32 protrudes around the body portion of the connector housing.

A tubular member 40 is provided at an intermediate section of the electric wire 20. Here, the tubular member 40 is provided at a position away from the connector 30 along a direction in which the electric wire 20 extends. Here, the tubular member 40 is provided on the opposite side to the connector 30 side relative to the bent section 12 of the electric wire 20. Here, the electric wire 20 extends from the connector 30, and is bent via the bent section 12, and the tubular member 40 is provided in a section of the electric wire 20 past the bent section 12. The electric wire 20 passes through the tubular member 40. One end portion of the tubular member 40 is attached to the wire cover 50. The tubular member 40 in this example is continuous along the axial direction thereof with the same outer diameter. The tubular member 40 described above is a rubber tube, for example. The tubular member 40 may be configured such that the outer diameter thereof alternately changes along the axial direction in the manner of a corrugated tube or the like.

Wire Cover

Figure 4:
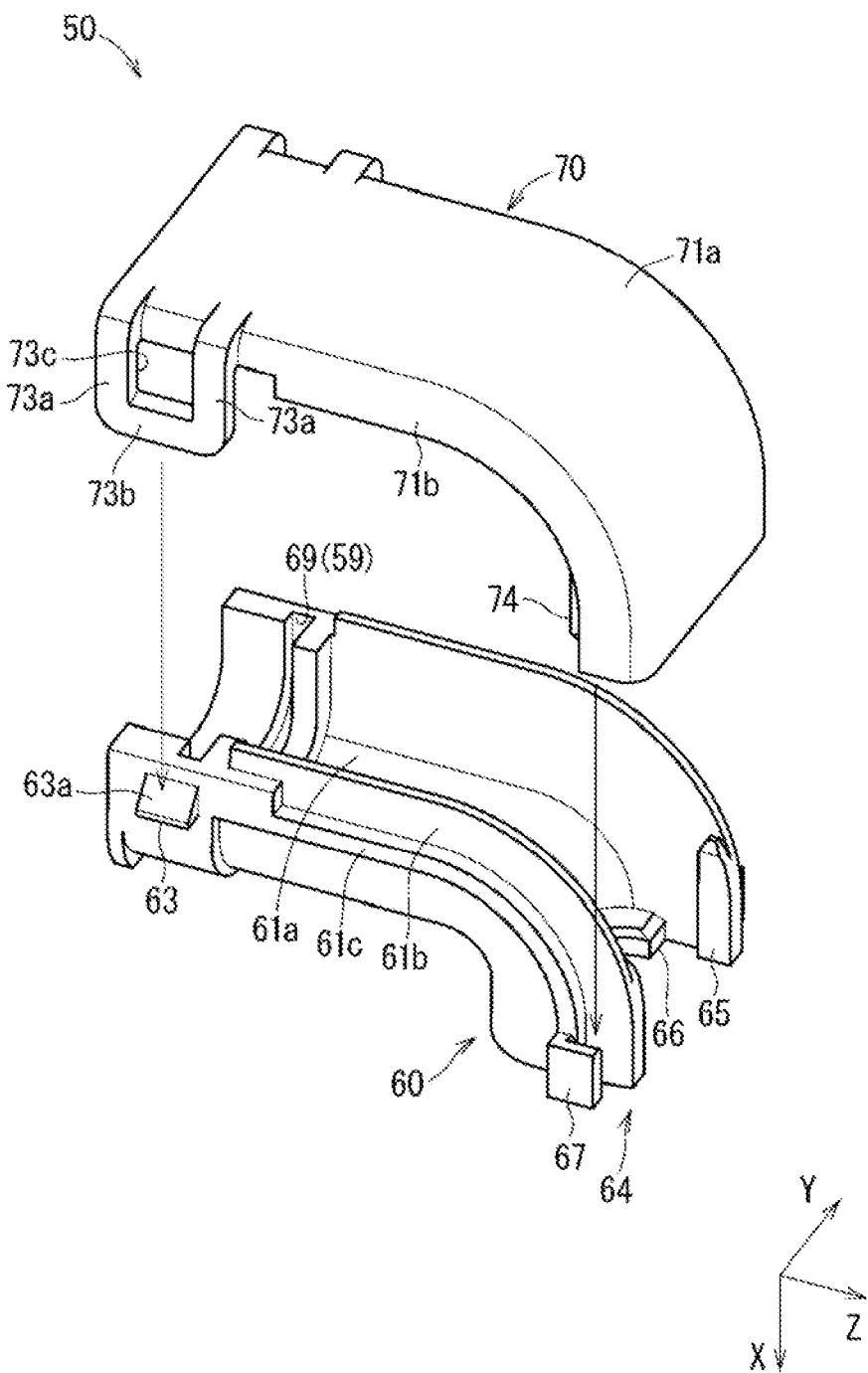
FIG. 4 is an exploded perspective view showing the wire cover.
Figure 5:
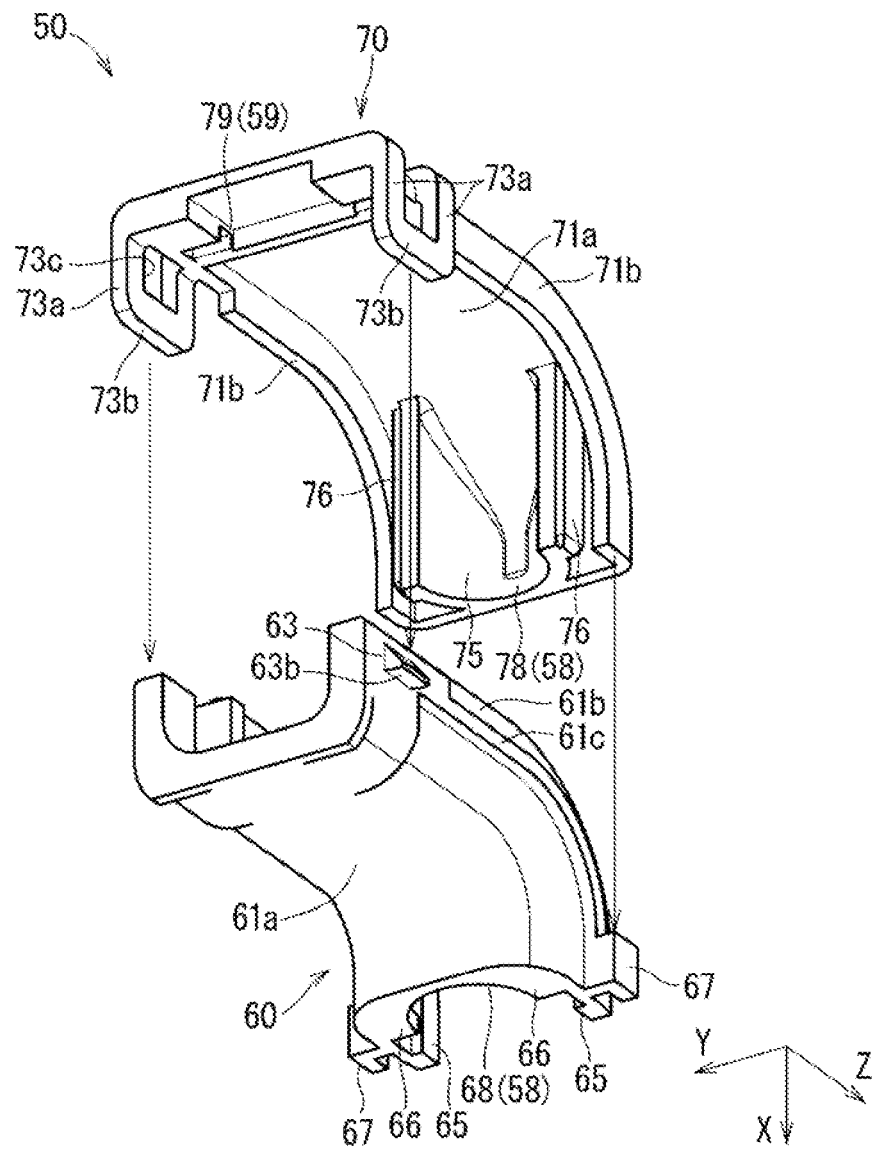
FIG. 5 is an exploded perspective view showing the wire cover.
Figure 6:
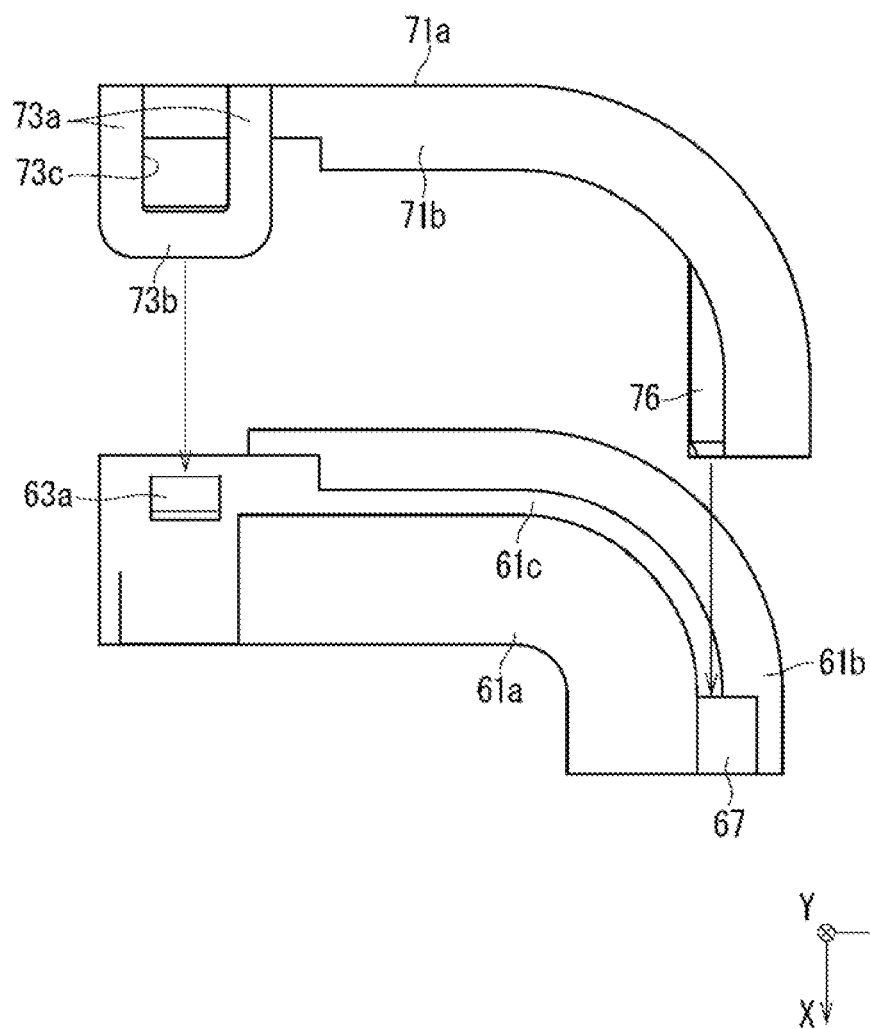
FIG. 6 is an exploded side view showing the wire cover.
Figure 7:
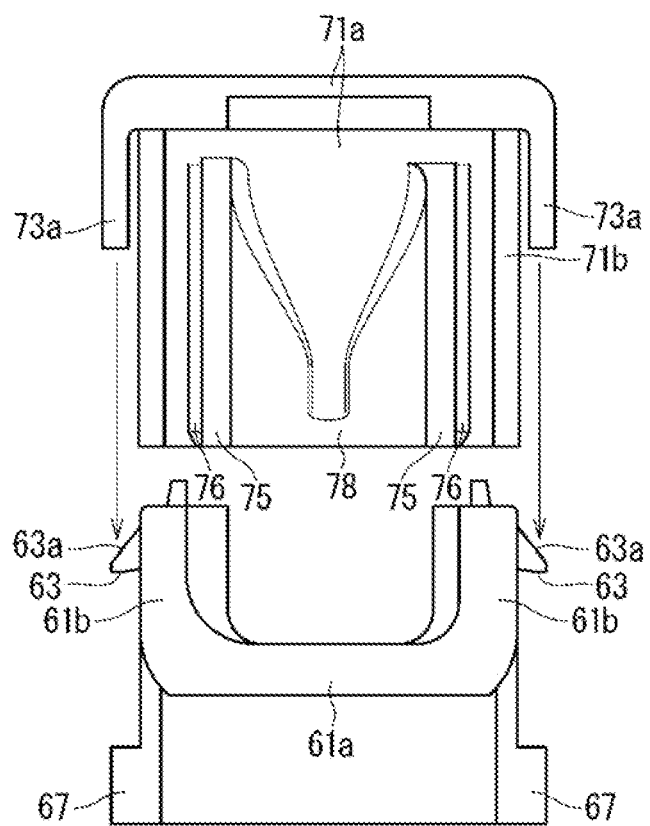
FIG. 7 is an exploded front view showing the wire cover.
Figure 8:
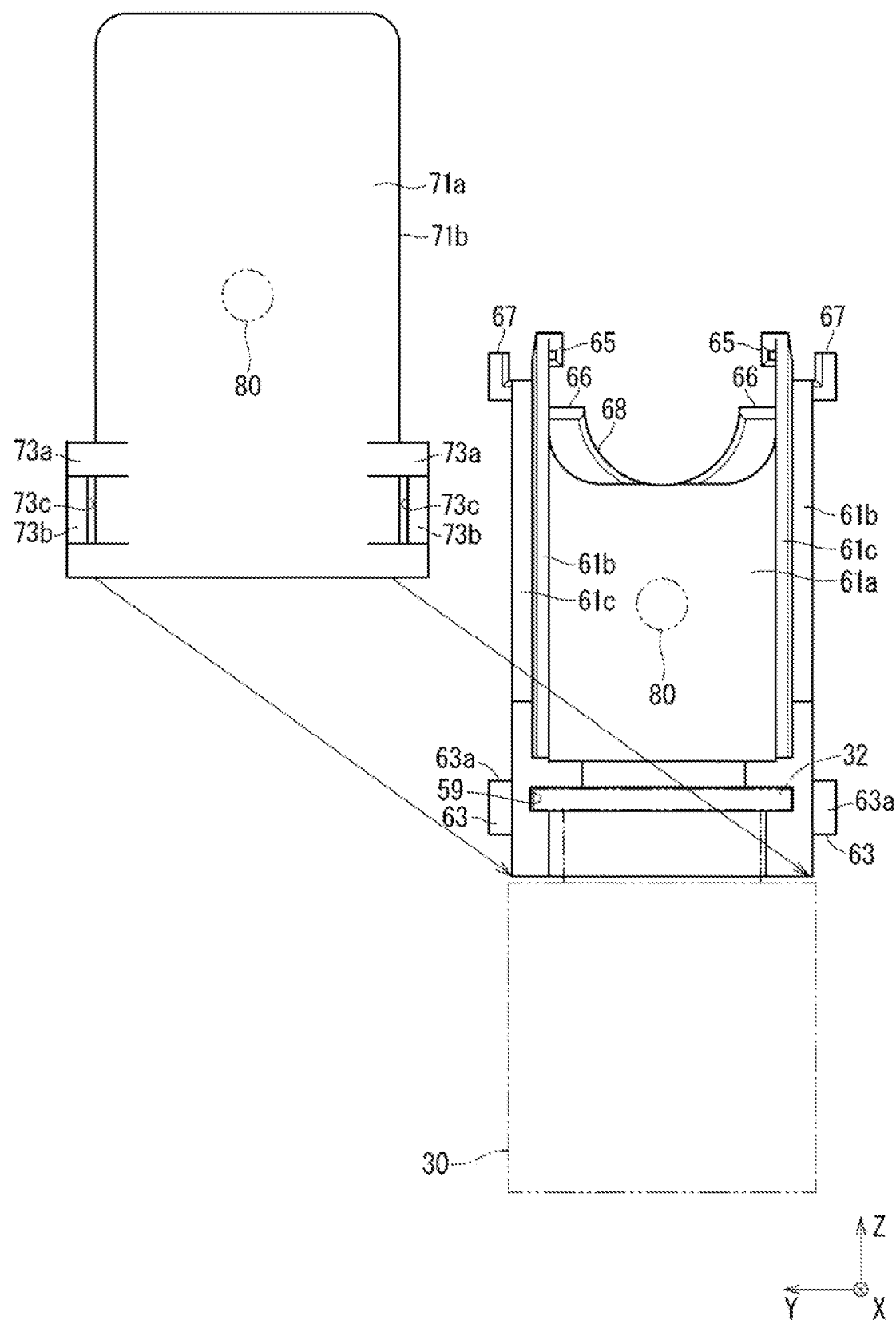
FIG. 8 is an exploded plan view showing the wire cover.
Figure 9:
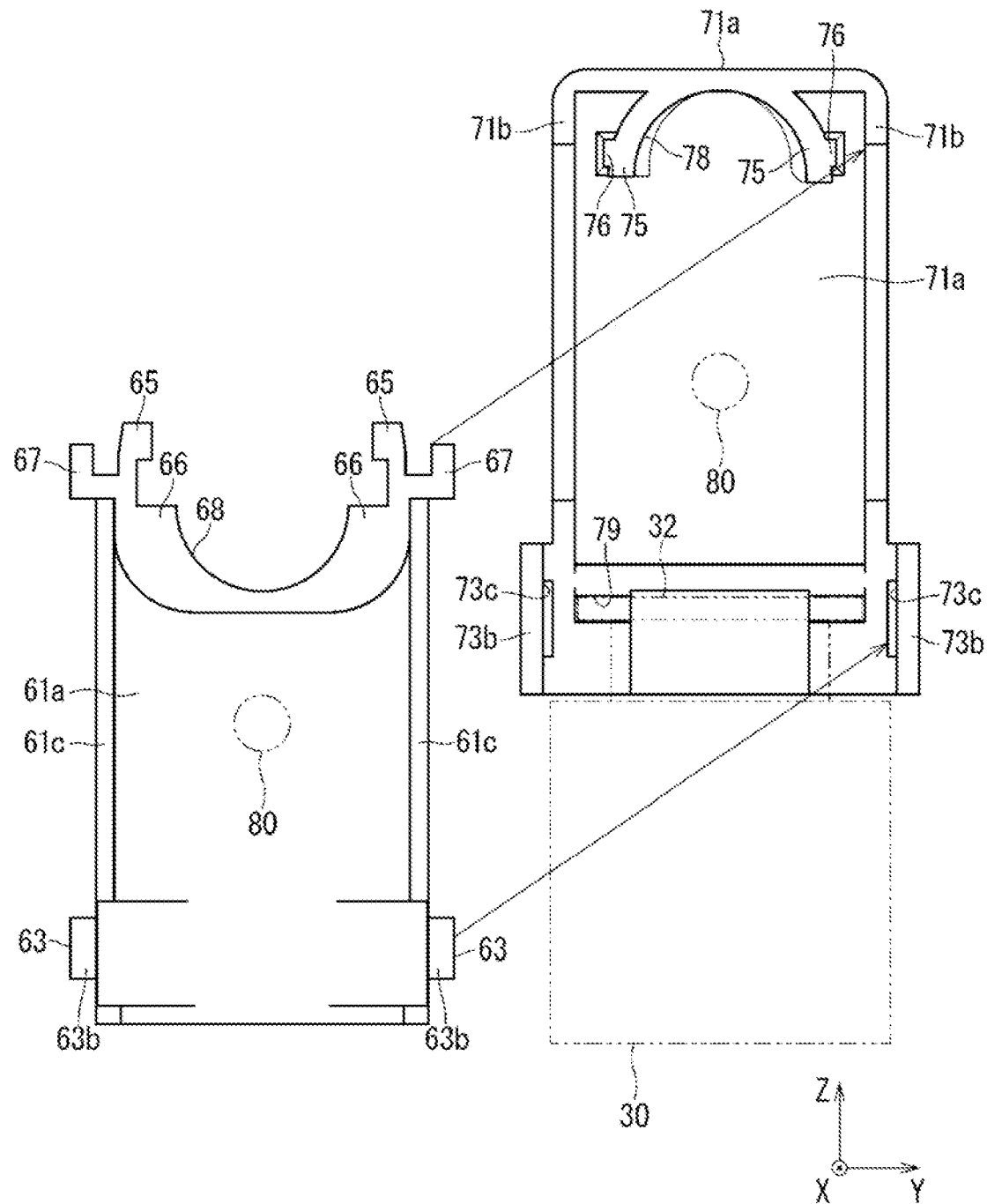
FIG. 9 is an exploded bottom surface view showing the wire cover.

The wire cover 50 will be described further with reference to FIGS. 4 to 9. FIGS. 4 and 5 are exploded perspective views showing the wire cover 50. FIGS. 4 and 5 are diagrams as seen from different viewpoints. FIG. 6 is an exploded side view showing the wire cover 50. FIG. 7 is an exploded front view showing the wire cover 50. FIG. 8 is an exploded plan view showing the wire cover 50. FIG. 9 is an exploded bottom view showing the wire cover 50.

The wire cover 50 holds the bent section 12 of the electric wire 20. A cover body 51, a first attachment portion 52, and a second attachment portion 54 are provided in the wire cover 50. The wire cover 50 includes an inner cover member 60 and an outer cover member 70.

The inner cover member 60 includes an inner cover body 61, a first inner attachment portion 62, and a second inner attachment portion 64. The inner cover body 61 covers the bent section 12 from the inner peripheral side thereof. The first inner attachment portion 62 is provided at one end portion of the inner cover body 61. The second inner attachment portion 64 is provided at the other end portion of the inner cover body 61.

The outer cover member 70 includes an outer cover body 71, a first outer attachment portion 72, and a second outer attachment portion 74. The outer cover body 71 covers the bent section 12 from the outer peripheral side thereof. The first outer attachment portion 72 is provided at one end portion of the outer cover body 71. The second outer attachment portion 74 is provided at the other end portion of the outer cover body 71.

The inner cover body 61 and the outer cover body 71 form the cover body 51 that covers the bent section 12. The first inner attachment portion 62 and the first outer attachment portion 72 form the first attachment portion 52. The second inner attachment portion 64 and the second outer attachment portion 74 form the second attachment portion 54. The inner cover member 60 and the outer cover member 70 are fixed to each other through attachment of the first attachment portion 52 and attachment of the second attachment portion 54, and form the wire cover 50.

Cover Body

Figure 10:
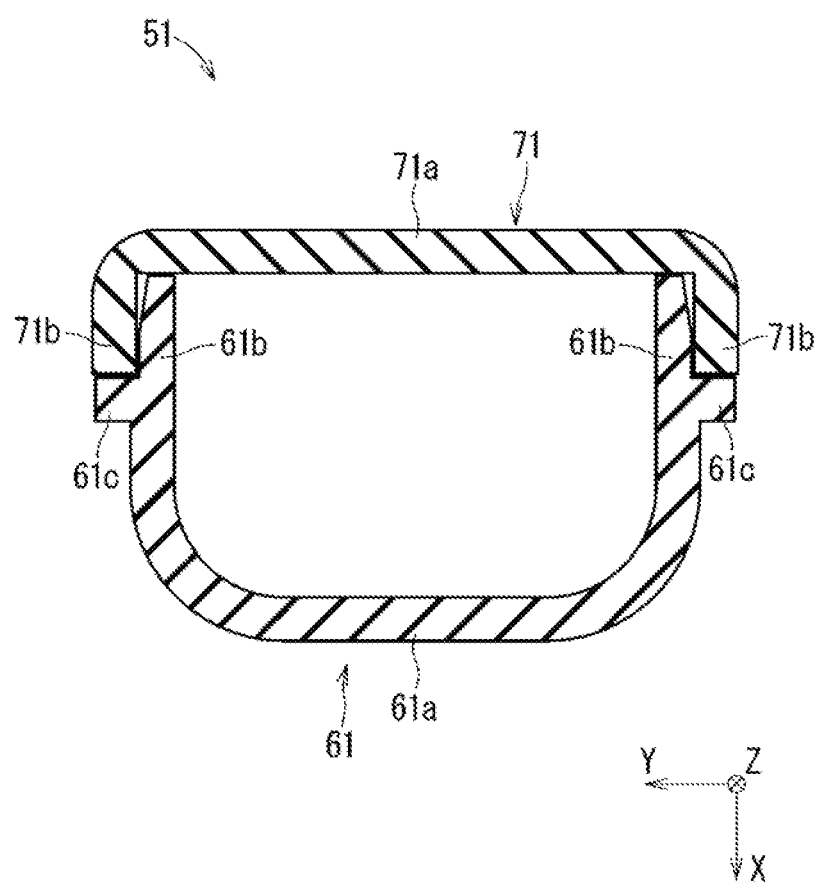
FIG. 10 is a cross-sectional view showing cover bodies.

The cover body 51 will be described further with respect to FIG. 10. FIG. 10 is a cross-sectional view showing the cover body 51. FIG. 10 is a cross-sectional view taken along the line X-X in FIG. 2.

The cover body 51 includes the inner cover body 61 and the outer cover body 71. The inner cover body 61 includes a bottom wall 61a, two side walls 61b, and supporting portions 61c. The outer cover body 71 includes a lid portion 71a and two side walls 71b.

The two side walls 61b protrude from two sides of the bottom wall 61a. A gutter-shaped housing portion is formed by the bottom wall 61a and the two side walls 61b. The lid portion 71a covers the bottom wall 61a and the two side walls 61b from above. The two side walls 71b protrude from two sides of the lid portion 71a. The two side walls 61b are positioned between the two side walls 71b. Accordingly, the inner cover body 61 and the outer cover body 71 are unlikely to be displaced in the Y direction. The two side walls 71b are supported by the supporting portions 61c. Accordingly, the inner cover body 61 and the outer cover body 71 are kept from inclining so as to open on one side in the Y direction, with a contact portion on the other side in the Y direction serving as a fulcrum. A gap between the inner cover body 61 and the outer cover body 71 is kept from opening.

One end portion of the inner cover body 61 and one end portion of the outer cover body 71 sandwich the electric wire 20 along the first direction. The other end portion of the inner cover body 61 and the other end portion of the outer cover body 71 sandwich the electric wire 20 along a second direction that intersects the first direction.

In this example, the electric wire 20 is bent by 90 degrees via the bent section 12. For this reason, the first direction and the second direction are orthogonal to each other. Specifically, the electric wire 20 extends in the Z direction on one side of the bent section 12, and extends in the X direction on the other side of the bent section 12. The one end portion of the inner cover body 61 and the one end portion of the outer cover body 71 sandwich the electric wire 20 along the X direction. The other end portion of the inner cover body 61 and the other end portion of the outer cover body 71 sandwich the electric wire 20 along the Z direction. In this example, the first direction is the X direction, and the second direction is the Z direction.

The electric wire 20 may be bent at an angle smaller than 90 degrees via the bent section 12, or may be bent at an angle larger than 90 degrees. The electric wire 20 may extend in the Z direction on one side of the bent section 12, and extend in a direction inclined from the X direction and the Z direction on the other side of the bent section 12, for example.

First Attachment Portion

Figure 11:
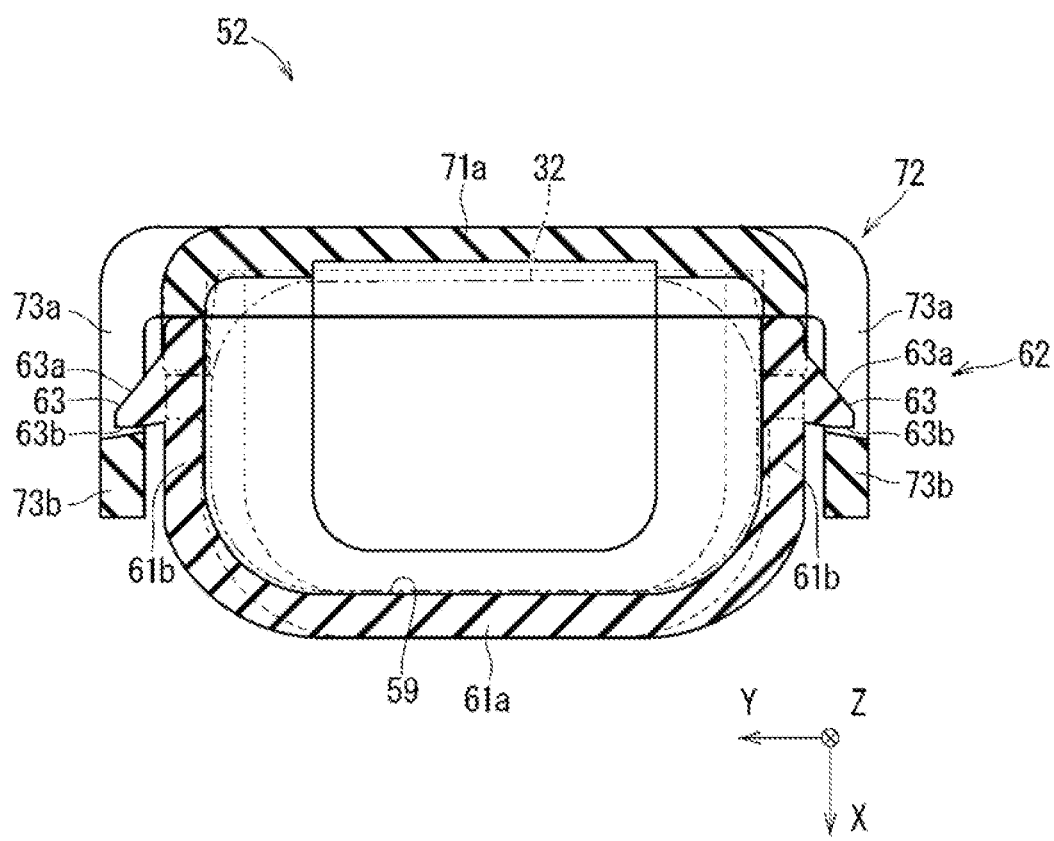
FIG. 11 is a cross-sectional view showing first attachment portions.

The first attachment portion 52 will be described further with reference to FIG. 11. FIG. 11 is a cross-sectional view showing the first attachment portion 52. FIG. 11 is a cross-sectional view taken along the line XI-XI in FIG. 2.

The first attachment portion 52 includes the first inner attachment portion 62 and the first outer attachment portion 72. The first inner attachment portion 62 includes lock protrusions 63. The first outer attachment portion 72 includes lock receiving portions 73.

The lock protrusions 63 protrude on two sides from the inner cover body 61. The lock protrusions 63 protrude outward from the outer surfaces of the two side walls 61b, respectively. Each of the lock protrusions 63 includes a guide surface 63a and an engaging surface 63b. The surface facing the negative side in the X direction of the lock protrusion 63 is the guide surface 63a. The surface facing the positive side in the X direction of the lock protrusion 63 is the engaging surface 63b.

The lock receiving portions 73 protrude on two sides from the outer cover body 71. The lock receiving portions 73 protrude from two end portions of the lid portion 71a, respectively. The side walls 71b of the outer cover body 71 end at the positions of the lock receiving portions 73, and instead, the lock receiving portions 73 are provided. Each lock receiving portion 73 includes extending pieces 73a and an engaging piece 73b. Pairs of extending pieces 73a protrude from respective end portions of the lid portion 71a. Each pair of extending pieces 73a are distanced from each other in the Z direction, which is a direction in which the electric wire 20 extends. The engaging piece 73b connects the leading end portions of the pair of extending pieces 73a. A lock recess 73c is formed in a portion surrounded by the extending pieces 73a and the engaging piece 73b.

When attaching the first attachment portion 52, the engaging pieces 73b move along the guide surfaces 63a. Accordingly, the inner cover member 60 elastically deforms such that the pair of lock protrusions 63 approach each other, the outer cover member 70 elastically deforms such that the distance between the pair of lock receiving portions 73 increases, or both the inner cover member 60 and the outer cover member 70 elastically deform such that the engaging pieces 73b move over the lock protrusions 63. Accordingly, the lock protrusions 63 are accommodated in the lock recesses 73c, and the first attachment portion 52 enters an attached state.

A direction that intersects a plane that includes the first direction (the X direction) and the second direction (the Z direction) is designated as a third direction. The third direction is the Y direction, for example. When observed from the third direction (the Y direction), the first attachment portion 52 is positioned outward of the innermost surface of the inner cover body 61 or inward of the outermost surface of the outer cover body 71. Here, when observed from the third direction (the Y direction), the first attachment portion 52 is positioned outward of the innermost surface of the inner cover body 61 and inward of the outermost surface of the outer cover body 71. When observed from the third direction (the Y direction), the first attachment portion 52 overlaps the inner cover body 61 and the outer cover body 71.

FIG. 2 is a diagram as observed from the third direction (the Y direction). As shown in FIG. 2, the first attachment portion 52 is positioned outward of (on the negative side in the X direction relative to) the surface of the inner cover body 61 on the innermost side of the bent section (the surface on the positive side in the X direction), or inward of (on the positive side in the X direction relative to) the surface of the outer cover body 71 on the outermost side of the bent section (the surface on the negative side in the X direction). Here, the first attachment portion 52 is positioned outward of (on the negative side in the X direction relative to) the surface of the inner cover body 61 on the innermost side of the bent section (the surface on the positive side in the X direction), and inward of (on the positive side in the X direction relative to) the surface of the outer cover body 71 on the outermost side of the bent section (the surface on the negative side in the X direction). The first attachment portion 52 overlaps the inner cover body 61 and the outer cover body 71.

The first attachment portion 52 in this example is a locking portion. At the one end portion that includes the first attachment portion 52, the inner cover member 60 and the outer cover member 70 engage with each other in all of the first direction (the X direction), the second direction (the Z direction), and the third direction (the Y direction). Specifically, in the X direction, the engaging surfaces 63b and the engaging pieces 73b engage with each other in a direction in which the inner cover member 60 and the outer cover member 70 move away from each other. In the X direction, the side walls 61b and the lid portion 71a engage with each other in a direction in which the inner cover member 60 and the outer cover member 70 approach each other. In the Y direction, the lock receiving portions 73 and the side walls 61b engage with each other. In the Z direction, the extending pieces 73a of the lock receiving portions 73 and side surfaces of the lock protrusions 63 engage with each other.

Second Attachment Portion

Figure 12:
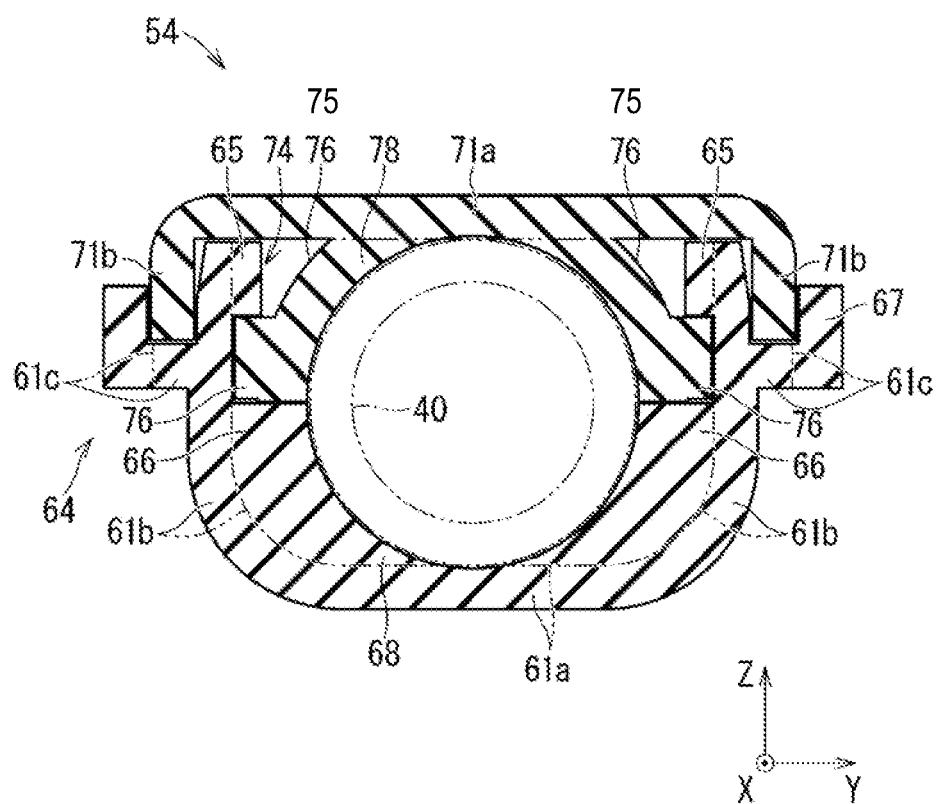
FIG. 12 is a cross-sectional view showing second attachment portions.

The second attachment portion 54 will be described further with reference to FIG. 12. FIG. 12 is a cross-sectional view showing the second attachment portion 54. FIG. 12 is a cross-sectional view taken along the line XII-XII in FIG. 2.

The second attachment portion 54 includes the second inner attachment portion 64 and the second outer attachment portion 74. At the other end portion that includes the second attachment portion 54, the inner cover member 60 and the outer cover member 70 overlap each other in the second direction (the Z direction) and the third direction (the Y direction), and engage with each other in the second direction (the Z direction) and the third direction (the Y direction) of the first direction (the X direction), the second direction (the Z direction) and the third direction (the Y direction). Here, at the other end portion that includes the second attachment portion 54, the inner cover member 60 and the outer cover member 70 overlap each other to form a three-or-more-layered structure along the second direction (the Z direction) and the third direction (the Y direction). Here, at the other end portion that includes the second attachment portion 54, the inner cover member 60 and the outer cover member 70 overlap to form a four-or-more-layered structure along the second direction (the Z direction) and the third direction (the Y direction).

Specifically, the second inner attachment portion 64 includes first inward-oriented protrusions 65, second inward-oriented protrusions 66, and outward-oriented protrusions 67. The second outer attachment portion 74 includes inward-oriented protrusions 75 and outward-oriented protrusions 76. Note that, in FIG. 12, the cover body 51 is indicated by a virtual line. The protrusions 65, 66, and 67 of the second inner attachment portion 64 are portions that protrude from the inner cover body 61. The protrusions 75 and 76 of the second outer attachment portion 74 are portions that protrude from the outer cover body 71.

The first inward-oriented protrusions 65 protrude inward from the inner surface of each side wall 61b, at a leading end portion thereof. The second inward-oriented protrusions 66 protrude inward from the inner surface of each side wall 61b, at a base end portion thereof. The first inward-oriented protrusions 65 and the second inward-oriented protrusions 66 are distanced from each other in the second direction (the Z direction).

The outward-oriented protrusions 67 protrude outward from the supporting portions 61c. The outward-oriented protrusions 67 cover the outer sides of the side walls 71b, respectively. As shown in FIG. 4, the first inward-oriented protrusion 65 is longer than the second inward-oriented protrusion 66 and the outward-oriented protrusion 67 in the X direction. The outward-oriented protrusions 67 are longer than the second inward-oriented protrusions 66 in the X direction.

The inward-oriented protrusions 75 protrude inward from the inner surface of the lid portion 71a. The outward-oriented protrusions 76 protrude outward from the outer surfaces of leading end portions of the inward-oriented protrusions 75. The outward-oriented protrusions 76 are each fitted between a first inward-oriented protrusion 65 and a second inward-oriented protrusion 66. As shown in FIG. 5, the inward-oriented protrusions 75 and the outward-oriented protrusions 76 extend from the other end portion of the outer cover body 71 and reach the inner surface of the outer cover body 71 at the position of the bent section in the X direction.

The inner cover member 60 and the outer cover member 70 form a four-layered structure in which four portions alternately overlap in the second direction (the Z direction). The lid portion 71a, the first inward-oriented protrusions 65, the outward-oriented protrusions 76, and the second inward-oriented protrusions 66 overlap in the stated order from the positive side to the negative side in the second direction (the Z direction), so as to form a four-layered structure. Accordingly, the second attachment portion 54 is unlikely to detach in the second direction (the Z direction) and to allow a gap to open. The second inward-oriented protrusions 66 reach a connection portion of the bottom wall 61a in the second direction (the Z direction). Also in this regard, the second attachment portion 54 is unlikely to detach in the second direction (the Z direction) and allow a gap to open.

A configuration may also be adopted in which, for example, the second inward-oriented protrusions 66 are omitted, and the inner cover member 60 and the outer cover member 70 form a three-layered structure in which three portions alternately overlap in the second direction (the Z direction). It is preferable that the inner cover member 60 and the outer cover member 70 form a three-or-more-layered structure in which three or more portions alternately overlap in the second direction (the Z direction).

The inner cover member 60 and the outer cover member 70 form a four-layered structure in which four portions alternately overlap in the third direction (the Y direction). On the two sides that sandwich the electric wire 20, the outward-oriented protrusions 76, the side walls 61b, the side walls 71b, and the outward-oriented protrusions 67 overlap in the stated order from the inner side (the electric wire 20 side) to the outer side in the third direction (the Y direction), so as to form a four-layered structure. Accordingly, the second attachment portion 54 is unlikely to detach in the third direction (the Y direction), and allow a gap to open.

A configuration may also be adopted in which the outward-oriented protrusions 67 or the outward-oriented protrusions 76 are omitted, and the inner cover member 60 and the outer cover member 70 form a three-layered structure in which three portions alternately overlap in the third direction (the Y direction), for example. A configuration may also be adopted in which both the outward-oriented protrusions 67 and the outward-oriented protrusions 76 are omitted, and the inner cover member 60 and the outer cover member 70 form a two-layered structure in which two portions alternately overlap in the third direction (the Y direction). Portions of the inner cover member 60 and the outer cover member 70 overlap both on one lateral side and on the other lateral side in the third direction (the Y direction). For this reason, even if two layers, namely the side walls 61b and the side walls 71b overlap in the third direction (the Y direction), the inner cover member 60 and the outer cover member 70 are kept from detaching.

When observed from the third direction (the Y direction), the second attachment portion 54 is positioned outward of the surface of the inner cover body 61 on the innermost side of the bent, or inward of the surface of the outer cover body 71 on the outermost side of the bent. Here, when observed from the third direction (the Y direction), the first attachment portion 52 and the second attachment portion 54 are positioned outward of the surface of the inner cover body 61 on the innermost side of the bent section, and inward of the surface of the outer cover body 71 on the outermost side of the bent section. When observed from the third direction (the Y direction), the first attachment portion 52 and the second attachment portion 54 overlap the inner cover body 61 and the outer cover body 71.

Specifically, as shown in FIG. 2, the second attachment portion 54 is positioned outward of (on the positive side in the Z direction relative to) the surface of the inner cover body 61 on the innermost side of the bent (the surface on the negative side in the Z direction), or inward of (on the negative side in the Z direction relative to) the surface of the outer cover body 71 on the outermost side (surface on the positive side in the Z direction) of the bent section. Here, the second attachment portion 54 is positioned outward of (on the positive side in the Z direction relative to) the surface of the inner cover body 61 on the innermost side (the surface on the negative side in the Z direction), and inward of (on the negative side in the Z direction relative to) the surface of the outer cover body 71 on the outermost side of the bent (the surface on the positive side in the Z direction). The second attachment portion 54 overlaps the inner cover body 61 and the outer cover body 71.

The inner cover member 60 and the outer cover member 70 move relative to each other along the first direction (the X direction), and the first attachment portion 52 and the second attachment portion 54 are attached to the inner cover member 60 and the outer cover member 70. At the other end portion that includes the second attachment portion 54, the inner cover member 60 and the outer cover member 70 do not engage with each other in the first direction (the X direction). The second inner attachment portion 64 and the second outer attachment portion 74 are configured to be movable in the first direction (the X direction) as do a slider and rail, and to not detach in the second direction (the Z direction) and the third direction (the Y direction).

Amount portion 59 that is fitted into the rear end portion of the connector 30 is provided at one of the one end portion and the other end portion of the wire cover 50. In this example, the mount portion 59 that is fitted into the rear end portion of the connector 30 is provided at the one end portion of the wire cover 50.

The mount portion 59 includes an internal groove 69 formed in the inner surface of the inner cover body 61 and an external groove 79 formed in the inner surface of the outer cover body 71. The flange portion 32 of the rear end portion of the connector 30 is fitted into the internal groove 69 and the external groove 79. A region around the position of the inner cover body 61 where the internal groove 69 is formed is thick. The lock protrusions 63 are provided on the outer side relative to the internal groove 69 in the inner cover body 61.

A tubular member attaching portion 58 that overlaps the tubular member 40 is provided at the other end portion of the wire cover 50. The tubular member 40 is attached by an inner attaching portion 68 of the inner cover body 61 and an outer attaching portion 78 of the outer cover body 71. Leading edge portions of the second inward-oriented protrusions 66 form the inner attaching portion 68. Leading edge portions of the inward-oriented protrusions 75 form the outer attaching portion 78.

The tubular member attaching portion 58 sandwiches the tubular member 40. One end portion of the tubular member 40 is housed in the wire cover 50 through the tubular member attaching portion 58. The other end portion of the tubular member 40 protrudes to the outside of the wire cover 50 through the tubular member attaching portion 58.

The inner surface of the tubular member attaching portion 58 has a shape that corresponds to the outer surface of the tubular member 40. Here, the outer surface of the tubular member 40 is circular, and thus the inner surface of the tubular member attaching portion 58 is also circular. The inner attaching portion 68 and the outer attaching portion 78 have a semicircular shape. The tubular member attaching portion 58 holds the tubular member 40 without crushing it. The size of the inner surface of the tubular member attaching portion 58 is the same as or slightly larger than the size of the outer surface of the tubular member 40. The tubular member attaching portion 58 may hold and crush the tubular member 40. The size of the inner surface of the tubular member attaching portion 58 may be slightly smaller than the size of the outer surface of the tubular member 40.

The one end portion of the tubular member 40 may be inserted into the wire cover 50 through the tubular member attaching portion 58 after the wire cover 50 is attached to the bent section 12. A configuration may be adopted in which, in a state where the one end portion of the tubular member 40 is positioned on the inner attaching portion 68, the inner cover member 60 and the outer cover member 70 move relative to each other along the first direction (the X direction), and the wire cover 50 is attached to the bent section 12.

The other end portion of the tubular member 40 may be fixed to the electric wire 20. A binding member such as adhesive tape or a cable tie may be wound around the tubular member 40 and the electric wire 20, thereby fixing the tubular member 40 and the electric wire 20.

The tubular member attaching portion 58 may also be configured such that the tubular member 40 is attached thereto outside the wire cover 50. A configuration may also be adopted in which the tubular member attaching portion 58 that has an outer diameter of about the same size as the inner diameter of the tubular member 40 protrudes outward from the cover body 51 along the direction in which the electric wire 20 extends, and the tubular member 40 covers the tubular member attaching portion 58, for example.

The inner cover member 60 and the outer cover member 70 are injection-molded articles made of a resin and obtained using metal molds. The inner cover member 60 and the outer cover member 70 have shapes that do not have an undercut so as to be removable upward and downward from the metal molds. Here, the X direction is a direction in which the injection-molded articles are removed from the metal molds. The inner cover member 60 and the outer cover member 70 are each formed into a shape that does not have an undercut in the X direction. A shape that does not have an undercut in the X direction means that a portion in which a protrusion, a recess, and a protrusion are continuous in the stated order in the X direction is not present at any position in a YZ plane. If there is a portion in which a protrusion, a recess, and a protrusion are continuous in the stated order in the X direction, the recess is hidden in both FIGS. 8 and 9 that are views as observed from the two sides in the X direction. Therefore, it can be said that a shape that does not have an undercut in the X direction means that there is no hidden recess in both FIGS. 8 and 9 that are views as observed from the two sides in the X direction.

A water drainage hole 80 may be formed in at least one of the inner cover body 61 and the outer cover body 71. In FIGS. 8 and 9, the water drainage hole 80 is indicated by a virtual line. The water drainage hole 80 in the inner cover body 61 may be a through hole that passes through the bottom portion of the inner cover body 61, for example. The water drainage hole 80 in the outer cover body 71 may also be a through hole that passes through the lid portion 71a of the outer cover body 71, for example. The water drainage hole 80 may be formed at any position of the inner cover body 61 and the outer cover body 71. The water drainage hole 80 may be positioned on the one end portion side or on the other end portion side relative to the bent section 12, for example. Here, the water drainage hole 80 is provided between the bent section 12 and the one end portion.

Effects, Etc.

With the wire cover 50 configured as described above and the wiring member 10 that includes the wire cover 50, the first attachment portion 52 and the second attachment portion 54 of the wire cover 50 that holds the bent section 12 of the electric wire 20 are provided bypassing regions on the inner side and outer side of the bent section 12. For this reason, it is possible to secure a space on at least one of the inner side and the outer side of the bent section 12.

In addition, the first attachment portion 52 is a locking portion in which the inner cover member 60 and the outer cover member 70 engage with each other in all of the first direction (the X direction), the second direction (the Z direction), and the third direction (the Y direction), and the second attachment portion 54 is an engagement portion in which the inner cover member 60 and the outer cover member 70 engage with each other in the second direction (the Z direction) and the third direction (the Y direction). Accordingly, it is easy to fix the inner cover member 60 and the outer cover member 70 using the first attachment portion 52 and the second attachment portion 54.

In addition, in the second attachment portion 54, the inner cover member 60 and the outer cover member 70 overlap in a three-or-more layer manner along each of the second direction (the Z direction) and the third direction (the Y direction). Accordingly, the second attachment portion 54 is unlikely to open in the second direction (the Z direction) and the third direction (the Y direction).

In addition, in the second attachment portion 54, the inner cover member 60 and the outer cover member 70 form a four-or-more-layered structure manner in which four or more portions overlap along the second direction (the Z direction) and the third direction (the Y direction). Accordingly, the second attachment portion 54 is even less likely to open in the second direction (the Z direction) and the third direction (the Y direction).

In addition, the mount portion 59 that is fitted into the rear end portion of the connector 30 is provided at one of the one end portion and the other end portion of the inner cover body 61 and the outer cover body 71. Accordingly, the wire cover 50 can hold the bent section 12 of the electric wire 20 extending from the connector 30 that is mounted to the connector 30.

In addition, the mount portion 59 is provided at one end portion of the inner cover body 61 and the outer cover body 71, and the flange portion 32 of the rear end portion of the connector 30 is fitted into the internal groove 69 and the external groove 79 in the mount portion 59. Accordingly, since the flange portion 32 of the rear end portion of the connector 30 is fitted into the internal groove 69 and the external groove 79 and the mount portion 59 can be provided at the one end portion where the locking portion is present, the state in which the mount portion 59 is mounted to the rear end portion of the connector 30 is easily stabilized.

In addition, the tubular member attaching portion 58 that overlaps the tubular member 40 is provided at the other end portion of the inner cover body 61 and the outer cover body 71. Accordingly, the tubular member 40, which is a rubber hose or the like, can be attached to the wire cover 50.

In addition, the water drainage hole 80 is formed in at least one of the inner cover body 61 and the outer cover body 71. Accordingly, water in the wire cover 50 can be allowed to escape to the outside of the wire cover 50 through the water drainage hole 80.

In addition, the inner cover member 60 and the outer cover member 70 are injection-molded articles obtained using metal molds, and are formed into shapes that have no undercut so as to be removable upward and downward from the metal molds. Accordingly, the shapes of the metal molds are simplified and it is possible to suppress an increase in cost.

In addition, with the wiring member 10 that includes the electric wire 20 and the wire cover 50, it is possible to secure a space in at least on one of the inner side and the outer side of the bent section 12, while the bent section 12 of the electric wire 20 is held in the wire cover 50.

Figure 13:
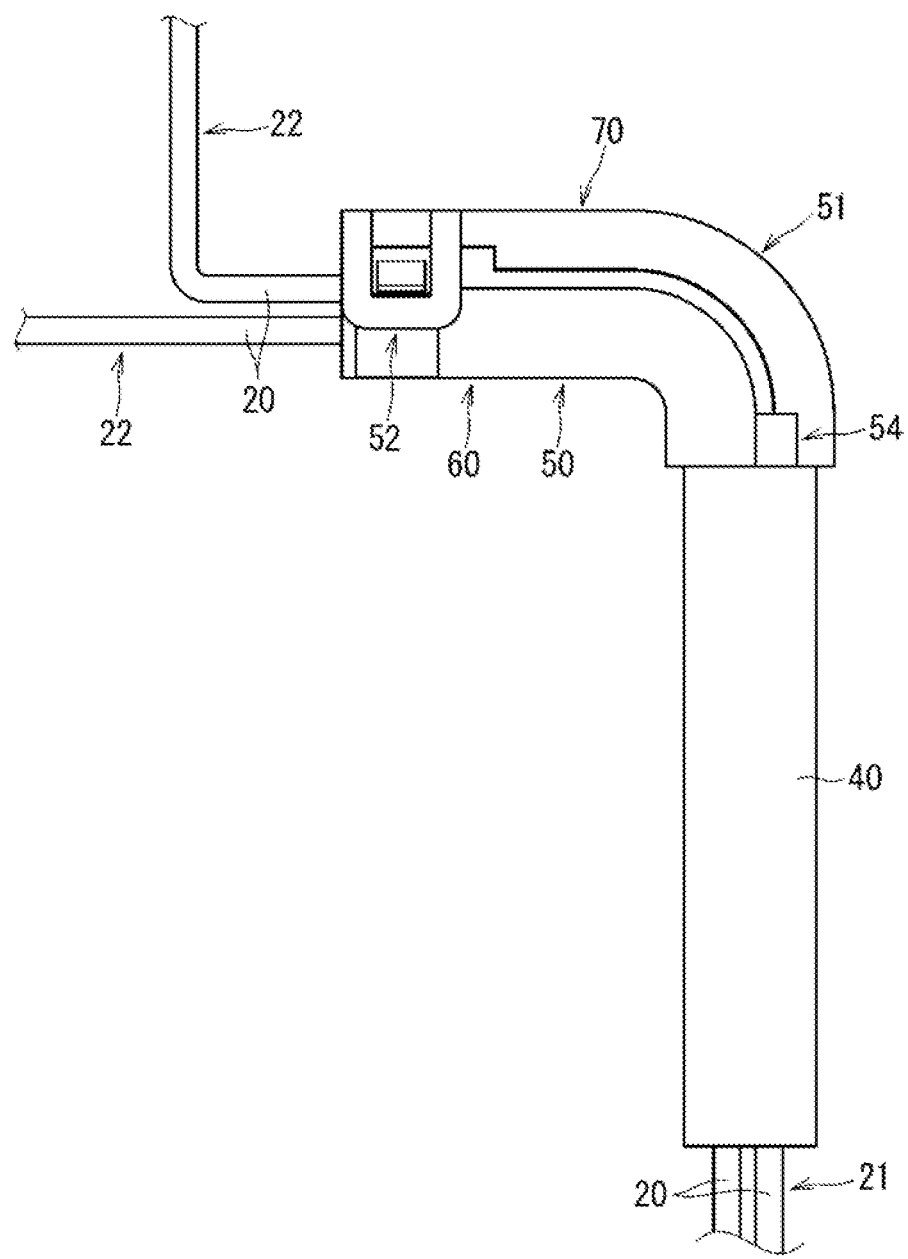
FIG. 13 is a side view showing a modification of a wiring member.

[Supplementary Note 1] FIG. 13 is a side view showing a modification of the wiring member 10.

In the above example, an example has been described in which the wire cover 50 is attached to the bent section 12 of the electric wire 20 extending from the connector 30, but the wire cover 50 may be attached to another bent section 12. As with a wiring member 110 shown in FIG. 13, for example, the wire cover 50 may be attached to a bent section 12 that is present in a branched section. In the example shown in FIG. 13, a plurality of electric wires 20 are separated into a plurality of branch wires 22 from a main wire 21. The main wire 21 has a bent section 12. The bent section 12 of the main wire 21 is held in the wire cover 50. The plurality of branch wires 22 extend from the wire cover 50 and are branched. The wire cover 50 may be attached to one of the branch wires 22. A bent section of a branch wire 22 may be held in the wire cover 50.

In addition, a description has been given above assuming that the mount portion 59 is provided in the wire cover 50, but this is not an essential configuration. As is the case with the example in FIG. 13, if the wire cover 50 is not mounted to the rear end portion of the connector 30, the mount portion 59 may be omitted.

In addition, a description has been given above assuming that, at the other end portion of the second attachment portion 54, the inner cover member 60 and the outer cover member 70 overlap each other in the second direction (the Z direction) and the third direction (the Y direction), and engage with each other in the second direction (the Z direction) and the third direction (the Y direction) of the first direction (the X direction), the second direction (the Z direction), and the third direction (the Y direction), but this is not an essential configuration. Also at the other end portion that includes the second attachment portion 54, the inner cover member 60 and the outer cover member 70 may engage with each other in all of the first direction (the X direction), the second direction (the Z direction), and the third direction (the Y direction), for example.

In addition, a description has been given above assuming that the tubular member attaching portion 58 is provided in the wire cover 50, but this is not an essential configuration. The tubular member attaching portion 58 may be omitted.

In addition, a description has been given above assuming that the water drainage hole 80 is provided in the wire cover 50, but this is not an essential configuration. The water drainage hole 80 may be omitted.

In addition, a description has been given above assuming that the inner cover member 60 and the outer cover member 70 are each formed into a shape that has no undercut, but this is not an essential configuration. One of or both of the inner cover member 60 and the outer cover member 70 may be formed into a shape that has an undercut. In this case, the inner cover member 60 or the outer cover member 70 that has an undercut can be formed using what is called as a slide metal mold.

Note that the configurations described in the above embodiment and the modification can be combined as appropriate provided that no contradiction arises.

What is claimed is:

1. A wire cover that holds a bent section of an electric wire, the wire cover comprising:
    an inner cover member that includes an inner cover body that covers the bent section from an inner peripheral side thereof, a first inner attachment portion provided at one end portion of the inner cover body, and a second inner attachment portion provided at the other end portion of the inner cover body; and an outer cover member that includes an outer cover body that covers the bent section from an outer peripheral side thereof, a first outer attachment portion provided at one end portion of the outer cover body, and a second outer attachment portion provided at the other end portion of the outer cover body, wherein the inner cover member and the outer cover member are fixed through attachment of a first attachment portion that includes the first inner attachment portion and the first outer attachment portion and a second attachment portion that includes the second inner attachment portion and the second outer attachment portion, the one end portion of the inner cover body and the one end portion of the outer cover body sandwich the electric wire along a first direction, the other end portion of the inner cover body and the other end portion of the outer cover body sandwich the electric wire along a second direction that intersects the first direction, the first attachment portion and the second attachment portion are positioned outward of a surface of the inner cover body on the innermost side of the bent section or inward of a surface of the outer cover body on the outermost side of the bent section when observed from a third direction that intersects a plane that includes the first direction and the second direction, and the inner cover member and the outer cover member move relative to each other along the first direction such that the first attachment portion and the second attachment portion are attached to the inner cover member and the outer cover member; and wherein the inner cover member and the outer cover member are separate pieces that are removably detached from each other along the first direction; and wherein one of the inner cover member and the outer cover member including a pair of first side walls recessed inwardly from a pair of supporting portions and the other of the inner cover member and the outer cover member includes a pair of second side walls configured to engage a corresponding one of the pair of supporting portions wherein an inner surface of each of the pair of second side walls engage an outer surface of a corresponding one of the pair of first side walls.

2. The wire cover according to claim 1, wherein, at the one end portions that include the first attachment portion, the inner cover member and the outer cover member engage with each other in all of the first direction, the second direction, and the third direction, and at the other end portions that include the second attachment portion, the inner cover member and the outer cover member overlap each other in the second direction and the third direction, and engage with each other in the second direction and the third direction of the first direction, the second direction, and the third direction.

3. The wire cover according to claim 2, wherein, at the other end portions that include the second attachment portion, the inner cover member and the outer cover member overlap each other to form a three-or-more-layered structure along the second direction and the third direction.

4. The wire cover according to claim 3, wherein, at the other end portions that include the second attachment portion, the inner cover member and the outer cover member overlap each other to form a four-or-more-layered structure along the second direction and the third direction.

5. The wire cover according to claim 2, wherein a mount portion that is fitted into a rear end portion of a connector is provided at the one end portion of the inner cover body and the outer cover body, the mount portion includes an internal groove formed in an inner surface of the inner cover body and an external groove formed in an inner surface of the outer cover body, and a flange portion of the rear end portion of the connector is fitted into the internal groove and the external groove.

6. The wire cover according to claim 1, wherein a mount portion that is fitted into a rear end portion of a connector is provided at one of the one end portion and the other end portion of the inner cover body and the outer cover body.

7. The wire cover according to claim 1, wherein a tubular member attaching portion that overlaps a tubular member is provided at the other end portions of the inner cover body and the outer cover body.

8. The wire cover according to claim 1, wherein a water drainage hole is formed in at least one of the inner cover body and the outer cover body.

9. The wire cover according to claim 1, wherein the inner cover member and the outer cover member are injection-molded articles obtained using metal molds, and are formed into shapes that have no undercut so as to be removable upward and downward from the metal molds.

10. The wire cover according to claim 1, wherein the first attachment portion and the second attachment portion are positioned outward of the surface of the inner cover body on the innermost side of the bent section and inward of the surface of the outer cover body on the outermost side of the bent section when observed from the third direction.

11. A wiring member comprising:
an electric wire that includes a bent section that is disposed along a bent path; and
the wire cover according to claim 1 attached to the bent section.

* * * * *